US012282797B1

(12) United States Patent
Sun et al.

(10) Patent No.: US 12,282,797 B1
(45) Date of Patent: Apr. 22, 2025

(54) REQUEST PROCESSING METHOD AND APPARATUS, AND DEVICE AND NONVOLATILE READABLE STORAGE MEDIUM

(71) Applicant: Suzhou MetaBrain Intelligent Technology Co., Ltd., Jiangsu (CN)

(72) Inventors: Jingben Sun, Jiangsu (CN); Minggang Sun, Jiangsu (CN); Qinglin Liu, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/987,030

(22) Filed: Dec. 19, 2024

Related U.S. Application Data

(63) Continuation of application No. PCT/CN2023/116229, filed on Aug. 31, 2023.

(30) Foreign Application Priority Data

Nov. 17, 2022 (CN) .......................... 202211437516.3

(51) Int. Cl.
G06F 9/455 (2018.01)
(52) U.S. Cl.
CPC .............. G06F 9/45558 (2013.01); *G06F 2009/45562* (2013.01); *G06F 2009/45579* (2013.01); *G06F 2009/45583* (2013.01)
(58) Field of Classification Search
None
See application file for complete search history.

(56) References Cited

U.S. PATENT DOCUMENTS 6,961,941 B1 * 11/2005 Nelson .................. G06F 9/4401
719/310
8,578,377 B2 * 11/2013 Ge .......................... G06F 9/5077
718/1

(Continued)

FOREIGN PATENT DOCUMENTS

CN 109302494 A 2/2019
CN 112764872 A 5/2021
(Continued)

OTHER PUBLICATIONS

International Search Report cited in PCT/CN2023/116229, mailed Nov. 5, 2023, 5 pages.
(Continued)

*Primary Examiner* — Van H Nguyen
(74) *Attorney, Agent, or Firm* — Cooper Legal Group, LLC

(57) ABSTRACT

The present application relates to the technical field of storage. Disclosed are a request processing method and apparatus, and a device and a non-volatile readable storage medium, which are applied to a request acceleration module for connecting a virtual machine and a back-end storage. The method includes: polling a request queue in shared memory, wherein a virtual machine and a request acceleration module, which are used for providing a unified storage service, both perform a read-write operation on the shared memory; and when it is polled that there is a target request, which is initiated within the virtual machine, in the request queue, processing the target request in the manner of calling a corresponding processing function.

17 Claims, 7 Drawing Sheets

(56) References Cited

U.S. PATENT DOCUMENTS

| | | | | |
|---|---|---|---|---|
| 8,639,492 B2* | 1/2014 | Bogsanyl | ............ | G06F 9/45558 |
| | | | | 718/100 |
| 8,959,529 B2* | 2/2015 | Nelson | .................... | G06F 9/455 |
| | | | | 718/1 |
| 9,183,030 B2* | 11/2015 | Nicholas | ............. | G06F 9/45558 |
| 9,411,627 B2* | 8/2016 | Chang | ................ | G06F 9/45558 |
| 10,031,767 B2* | 7/2018 | Nair | .................... | G06F 9/45541 |
| 10,296,369 B2* | 5/2019 | Iyer | ..................... | G06F 9/45558 |
| 10,747,730 B2* | 8/2020 | Dimitrov | ............ | H04L 67/1097 |
| 10,768,964 B2 | 9/2020 | Kurichiyath et al. | | |
| 11,182,190 B2* | 11/2021 | Gong | .................. | G06F 9/45558 |
| 11,567,803 B2* | 1/2023 | Haywood | ............ | G06F 12/0238 |
| 12,106,134 B2* | 10/2024 | Pinto | .................... | G06F 9/45558 |

FOREIGN PATENT DOCUMENTS

| | | | |
|---|---|---|---|
| CN | 113110916 A | 7/2021 | |
| CN | 113703672 A | 11/2021 | |
| CN | 114356598 A | 4/2022 | |
| CN | 114584541 A | 6/2022 | |
| CN | 115576654 A | 1/2023 | |

OTHER PUBLICATIONS

Written Opinion cited in PCT/CN2023/116229, mailed Nov. 5, 2023, 7 pages.
First Office Action cited in CN202211437516.3, mailed 203-01-19, 10 pages.
Notification to Grant Patent Right for Invention cited in CN202211437516.3, mailed Feb. 9, 2023, 3 pages.

* cited by examiner

REQUEST PROCESSING METHOD AND APPARATUS, AND DEVICE AND NONVOLATILE READABLE STORAGE MEDIUM

CROSS-REFERENCE TO RELATED APPLICATION

This application is a continuation of International Application No. PCT/CN2023/116229, filed Aug. 31, 2023, which claims priority to Chinese Patent Application No. 202211437516.3, filed with the China National Intellectual Property Administration on Nov. 17, 2022 and entitled "REQUEST PROCESSING METHOD AND APPARATUS, AND DEVICE AND STORAGE MEDIUM". The contents of International Application No. PCT/CN2023/116229 and Chinese Patent Application No. 202211437516.3 are incorporated herein by reference in their entireties.

FIELD

The present application relates to the technical field of storage, and in particular to a request processing method and apparatus, and a device and a non-volatile readable storage medium.

BACKGROUND

In traditional unified storage architecture using a virtual machine as a network attached storage (NAS) service carrier, the virtual machine connects physical space of a back-end storage through an Internet small computer system interface (iscsi) protocol, resulting in a lengthy input/output (I/O) path and significant overhead for protocol encapsulation and analysis. The NAS of the unified storage architecture uses the virtual machine as a carrier for connecting a back-end disc, usually maps into a local block device within the virtual machine based on an Internet protocol storage area network (ipsan) technology provided by a storage area network (SAN), and then creates a file system and loads a shared service on this basis, which requires a large number of memory copies and a large number of switches between a user mode and a kernel mode, resulting in low performance of the NAS that uses the virtual machine as the carrier.

Therefore, the foregoing technical problems urgently need to be solved by those skilled in the art.

SUMMARY

In view of this, an objective of the present application is to provide a request processing method and apparatus, and a device and a non-volatile readable storage medium, which might reduce the number of memory copies and the number of switches between a user mode and a kernel mode, shorten an I/O path, and reduce the overhead for I/O processing, thereby improving the performance of the whole storage system. An optional solution is as follows:

A first aspect of the present application provides a request processing method, applied to a request acceleration module for connecting a virtual machine and a back-end storage, including:

polling a request queue in shared memory, where the virtual machine and the request acceleration module, which are configured to provide a unified storage service, both might perform a read-write operation on the shared memory; and in a case that it is polled that there is a target request, which is initiated within the virtual machine, in the request queue, processing the target request in a manner of calling a corresponding processing function.

In some embodiments, the request processing method further includes:

pre-allocating, by an operating system, huge page memory for the virtual machine in a startup stage of a storage system, and obtaining the shared memory in a manner of creating a mapping relationship between a physical address within the virtual machine and the huge page memory.

In some embodiments, the obtaining, by the operating system, the shared memory in a manner of creating a mapping relationship between a physical address within the virtual machine and the huge page memory includes:

creating, by the operating system, the mapping relationship between the physical address within the virtual machine and the huge page memory;

sending, by the virtual machine, the created mapping relationship to the request acceleration module; and determining, by the request acceleration module, a memory address range according to the mapping relationship to obtain the shared memory.

In some embodiments, the sending, by the virtual machine, the created mapping relationship to the request acceleration module includes:

sending, by the virtual machine, a communication signal carrying the mapping relationship to the request acceleration module.

In some embodiments, the sending, by the virtual machine, a communication signal carrying the mapping relationship to the request acceleration module includes:

sending, by the virtual machine, the communication signal carrying the mapping relationship to the request acceleration module through a control file.

In some embodiments, after the pre-allocating, by an operating system, huge page memory for the virtual machine in a startup stage of a storage system, the method further includes:

starting up the request acceleration module and creating a control file after startup, whereby the request acceleration module communicates with the virtual machine through the control file.

In some embodiments, the creating, by the request acceleration module, a control file after startup includes:

creating, by the request acceleration module, a sock file used for communication between the request acceleration module and the virtual machine after startup.

In some embodiments, after the starting up the request acceleration module and creating a control file after startup, the method further includes:

using the control file as a parameter for starting up the virtual machine to start up the virtual machine or using the control file for the communication between the request acceleration module and the virtual machine.

In some embodiments, the creating, by the operating system, the mapping relationship between the physical address within the virtual machine and the huge page memory further includes:

reading, by the virtual machine, the huge page memory and the control file, and starting up by using the huge page memory and the control file.

In some embodiments, the sending, by the virtual machine, the created mapping relationship to the request acceleration module includes:

sending, by the virtual machine, the communication signal carrying the mapping relationship to the request acceleration module through a control file.

In some embodiments, the determining, by the request acceleration module, a memory address range according to the mapping relationship to obtain the shared memory includes:

receiving, by the request acceleration module, the communication signal, analyzing the communication signal to obtain the mapping relationship, and determining the memory address range according to the mapping relationship to obtain the shared memory.

In some embodiments, the polling a request queue in shared memory includes: polling the request queue in the shared memory, and in a case that it is polled that a new request enters the request queue, determining the new request as the target request; and the in a case that it is polled that there is a target request, which is initiated within the virtual machine, in the request queue, processing the target request in a manner of calling a corresponding processing function includes: calling the corresponding processing function to process corresponding data of the target request, where data is stored in the request queue in the shared memory in a case that the request is initialized within the virtual machine.

In some embodiments, the request queue includes a first request queue and a second request queue.

Correspondingly, the polling the request queue in the shared memory includes:

respectively polling the first request queue and the second request queue in the shared memory, where the first request queue stores a target read request initiated within the virtual machine, and the second request queue stores a target write request initiated within the virtual machine.

In some embodiments, the respectively polling the first request queue and the second request queue in the shared memory further includes:

respectively polling the first request queue and the second request queue in the shared memory in real time; or intermittently polling each of the first request queue and the second request queue in the shared memory according to a preset period.

In some embodiments, after the processing the target request in a manner of calling a corresponding processing function, the method further includes:

generating a request processing completion signal, and sending the request processing completion signal to the virtual machine.

In some embodiments, in a case that the target request is the target read request, after the processing the target request in a manner of calling a corresponding processing function, the method further includes:

storing target data read according to the target read request to the first request queue; and generating a request processing completion signal, and sending the request processing completion signal to the virtual machine, whereby the virtual machine reads the target data from the first request queue according to the request processing completion signal.

In some embodiments, the request processing method further includes:

creating, by the request acceleration module, the request queue in a manner of creating a circular queue based on the shared memory.

A second aspect of the present application provides a request processing apparatus, applied to a request acceleration module for connecting a virtual machine and a back-end storage, including:

a queue polling module, configured to poll a request queue in shared memory, where the virtual machine and the request acceleration module, which are configured to provide a unified storage service, both might perform a read-write operation on the shared memory; and a request processing module, configured to: in a case that it is polled that there is a target request, which is initiated within the virtual machine, in the request queue, process the target request in a manner of calling a corresponding processing function.

A third aspect of the present application provides an electronic device. The electronic device includes a processor and a memory, where the memory is configured to store a computer program, and the computer program is loaded and executed by the processor to implement the foregoing request processing method.

A fourth aspect of the present application provides a non-volatile readable storage medium. The non-volatile readable storage medium stores computer executable instructions. The computer executable instructions implement the foregoing request processing method when loaded and executed by a processor.

In the present application, a request queue in shared memory is polled first, where a virtual machine and a request acceleration module, which are configured to provide a unified storage service, both might perform a read-write operation on the shared memory; and when it is polled that there is a target request, which is initiated within the virtual machine, in the request queue, the target request is processed in the manner of calling a corresponding processing function. It might be learned that, in the present application, the request acceleration module is provided between the virtual machine and the back-end storage, and the request acceleration module connects the virtual machine and the back-end storage, and processes an I/O request by means of using the shared memory and request queue polling, whereby the number of memory copies and the number of switches between a user mode and a kernel mode are reduced. By implementing a virtual machine-request acceleration module, an I/O path is shortened, the overhead for I/O processing is reduced, and the speed of connecting a backend of the virtual machine to a disc array is increased, thereby accelerating I/O processing performance and improving the performance of the whole storage system.

BRIEF DESCRIPTION OF THE DRAWINGS

To describe technical solutions in embodiments of the present application or a prior art more clearly, the following briefly describes the drawings required for describing the embodiments or the prior art. Apparently, the drawings in the following descriptions show merely embodiments of the present application, and those of ordinary skill in the art may obtain other drawings according to the provided drawings without creative efforts.

DETAILED DESCRIPTION

Technical solutions in embodiments of the present application are clearly and completely described below with reference to the drawings in the embodiments of the present application. Apparently, the described embodiments are merely part rather than all of the embodiments in the present application. Based on the embodiments in the present application, all other embodiments obtained by those of ordinary skill in the art without creative work fall within the scope of protection of the present application.

In existing unified storage architecture using a virtual machine as an NAS service carrier, the virtual machine connects physical space of a back-end storage through an iscsi protocol, resulting in a lengthy IO path and significant overhead for protocol encapsulation and analysis. The NAS of the unified storage architecture uses the virtual machine as a carrier for connecting a back-end disc, usually maps into a local block device within the virtual machine based on an ipsan technology provided by a SAN, and then creates a file system and loads a shared service on this basis, which requires a large number of memory copies and a large number of switches between a user mode and a kernel mode, resulting in low performance of the NAS that uses the virtual machine as the carrier. For the foregoing technical defects, the present application provides a request processing solution. In the present application, a request acceleration module is provided between the virtual machine and the back-end storage, the request acceleration module connects the virtual machine and the back-end storage, and processes an I/O request by means of using the shared memory and request queue polling, whereby the number of memory copies and the number of switches between a user mode and a kernel mode are reduced. By implementing a virtual machine-request acceleration module, an I/O path is shortened, the overhead for I/O processing is reduced, and the speed of connecting a backend of the virtual machine to a disc array is increased, thereby accelerating I/O processing performance and improving the performance of the whole storage system.

Figure 7:
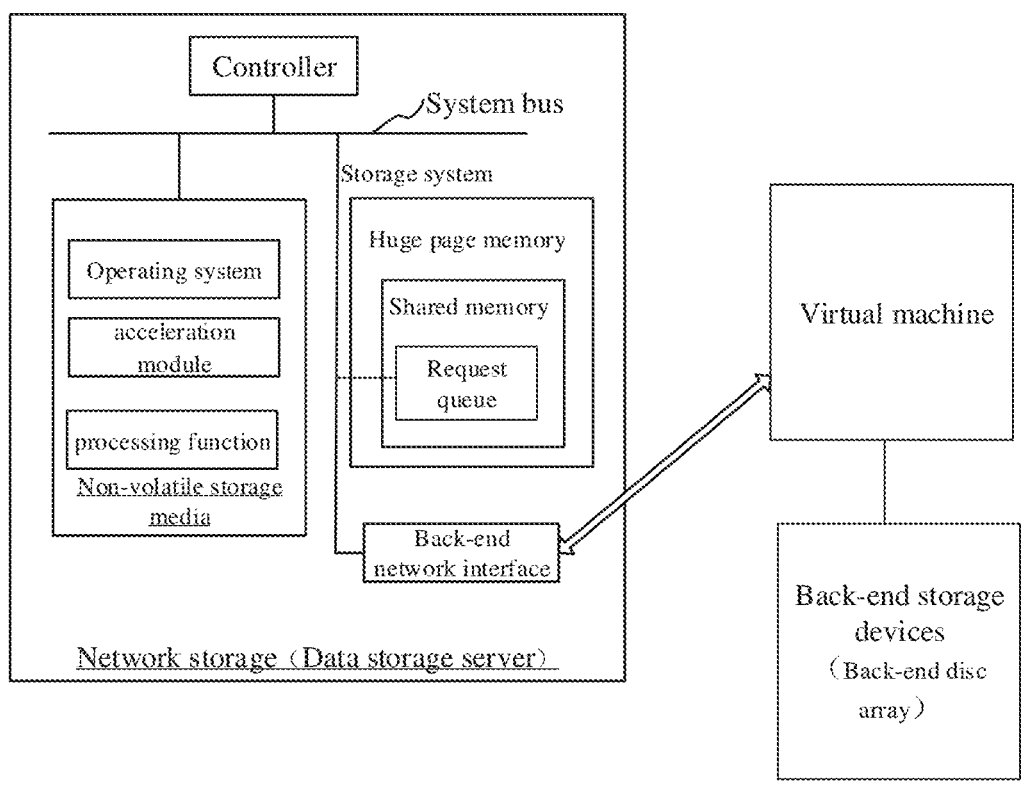
FIG. 7 is a diagram of an application scenario of a request processing method according to an embodiment of the present application.

Referring to FIG. 7, FIG. 7 illustrates a schematic diagram of an application scenario of a request processing method in some embodiments. Taking a NAS service as an example, for unified storage implementation architecture which provides the NAS service through the virtual machine, the backend of the NAS service and a SAN service share a back-end disc array. The NAS service connects the VMs through the back-end network interface to connect to the back-end disk arrays and provides the NAS service externally through the front-end network interface. In this application scenario, an IO processing acceleration module for NAS back-end might be added based on the NAS unified storage architecture. The NAS is a dedicated data storage server, it might be structured at least as shown in FIG. 7, and wherein the acceleration module might be understood as a computer program module comprising computer-readable instructions that are stored in a non-volatile computer storage medium and are capable of being read by the controller of the NAS server to perform the request processing method of an embodiment of the present application.

Hereinafter, a request processing method of an embodiment of the present application is described in detail based on the application scenario shown in FIG. 7.

Figure 1:
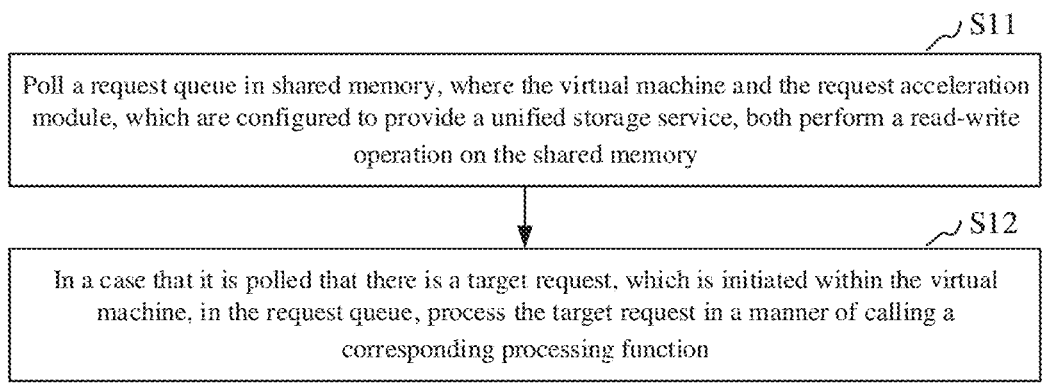
FIG. 1 is a flowchart of a request processing method according to an embodiment of the present application.

FIG. 1 is a flowchart of a request processing method according to an embodiment of the present application. Referring to FIG. 1, the request processing method, applied to a request acceleration module for connecting a virtual machine and a back-end storage, includes the following steps:

S11: polling a request queue in shared memory, where the virtual machine and the request acceleration module, which are configured to provide a unified storage service, both might perform a read-write operation on the shared memory.

A paravirtualization technology is to modify a guest operating system, and add a dedicated application programming interface (API) to optimize instructions issued by the guest operating system based on full virtualization, that is, a hypervisor does not need to consume a certain number of resources to perform a translation operation. Therefore, workload of the hypervisor becomes very low, and the overall performance is greatly improved. The hypervisor is a software layer or a subsystem, which is referred to as a virtual machine monitor (VMM). For the VMM, actual physical memory is managed, and physical memory of each virtual machine needs to be allocated and managed. For the guest operating system (a virtual machine instance), continuous physical address space is available. Therefore, the VMM may have a large number of I/O address translations, an I/O path is lengthy, and a large number of switches between a user mode and a kernel mode are involved, resulting in low storage performance of the overall storage system.

In this embodiment, the request acceleration module is provided between the virtual machine and the back-end storage. The request acceleration module connects the virtual machine and the back-end storage, and is configured to shorten the I/O path and reduce the overhead for I/O processing. Taking a NAS service as an example, for unified storage implementation architecture which provides the NAS service through the virtual machine, the backend of the NAS service and a SAN service share a back-end disc array. The NAS service is connected to the back-end disc array through the virtual machine, and provides the NAS service to the outside through a front-end network port. This embodiment, that is, adding an I/O processing acceleration module at the backend of the NAS based on unified storage architecture, improves the backend I/O processing speed.

It may be understood that, the NAS literally refers to an apparatus that is connected to a network and has a data storage function, hence it is alternatively referred to as a "network storage". The NAS is a dedicated data storage server. The NAS takes data as a center, thoroughly separates a storage device from a server, and performs centralized management on data, thereby freeing up bandwidth, improving performance, reducing total costs of ownership, and protecting investments. The costs of the NAS are much lower than that caused by using server storage, but the efficiency is much higher than that of the later one. The request processing solution of this embodiment is suitable for other storage systems. This is not limited in this embodiment.

In this embodiment, the shared memory is shared by the virtual machine and the back-end request acceleration module. Both the virtual machine and the request acceleration module may perform reading and writing on a memory address within this range. The memory address to be issued by I/O data will be recorded in an I/O data structure transmitted during reading and writing. That is, the virtual machine and the request acceleration module, which are configured to provide a unified storage service, both might perform a read-write operation on the shared memory. In addition, a request queue is also set in the shared memory, and the number and types of the request queues may be customized according to service needs. These are not limited in this embodiment.

S12: in a case that it is polled that there is a target request, which is initiated within the virtual machine, in the request queue, processing the target request in a manner of calling a corresponding processing function.

In this embodiment, when the request queue is polled, in a case that it is polled that there is a target request, which is initiated within the virtual machine, in the request queue, the target request is processed in a manner of calling a corresponding processing function. When the request is initiated within the virtual machine, data will be stored in the request queue in the shared memory, and the back-end request acceleration module calls the corresponding processing function to process the data when it is found that a new request enters the queue by polling the request queue in the shared memory all the time. In a manner of using the shared memory+I/O queue polling, the overhead for switching between a user mode and a kernel mode is reduced, and an I/O path is shortened, thereby improving the performance of the overall storage system.

It might be learned that, in the embodiment of the present application, a request queue in shared memory is polled first, where a virtual machine and a request acceleration module, which are configured to provide a unified storage service, both might perform a read-write operation on the shared memory; and when it is polled that there is a target request, which is initiated within the virtual machine, in the request queue, the target request is processed in the manner of calling a corresponding processing function. In the embodiment of the present application, the request acceleration module is provided between the virtual machine and the back-end storage, and the request acceleration module connects the virtual machine and the back-end storage, and processes an I/O request by means of using the shared memory and request queue polling, whereby the number of memory copies and the number of switches between a user mode and a kernel mode are reduced. By implementing a virtual machine-request acceleration module, an I/O path is shortened, the overhead for I/O processing is reduced, and the speed of connecting a backend of the virtual machine to a disc array is increased, thereby accelerating I/O processing performance and improving the performance of the whole storage system.

Figure 2:
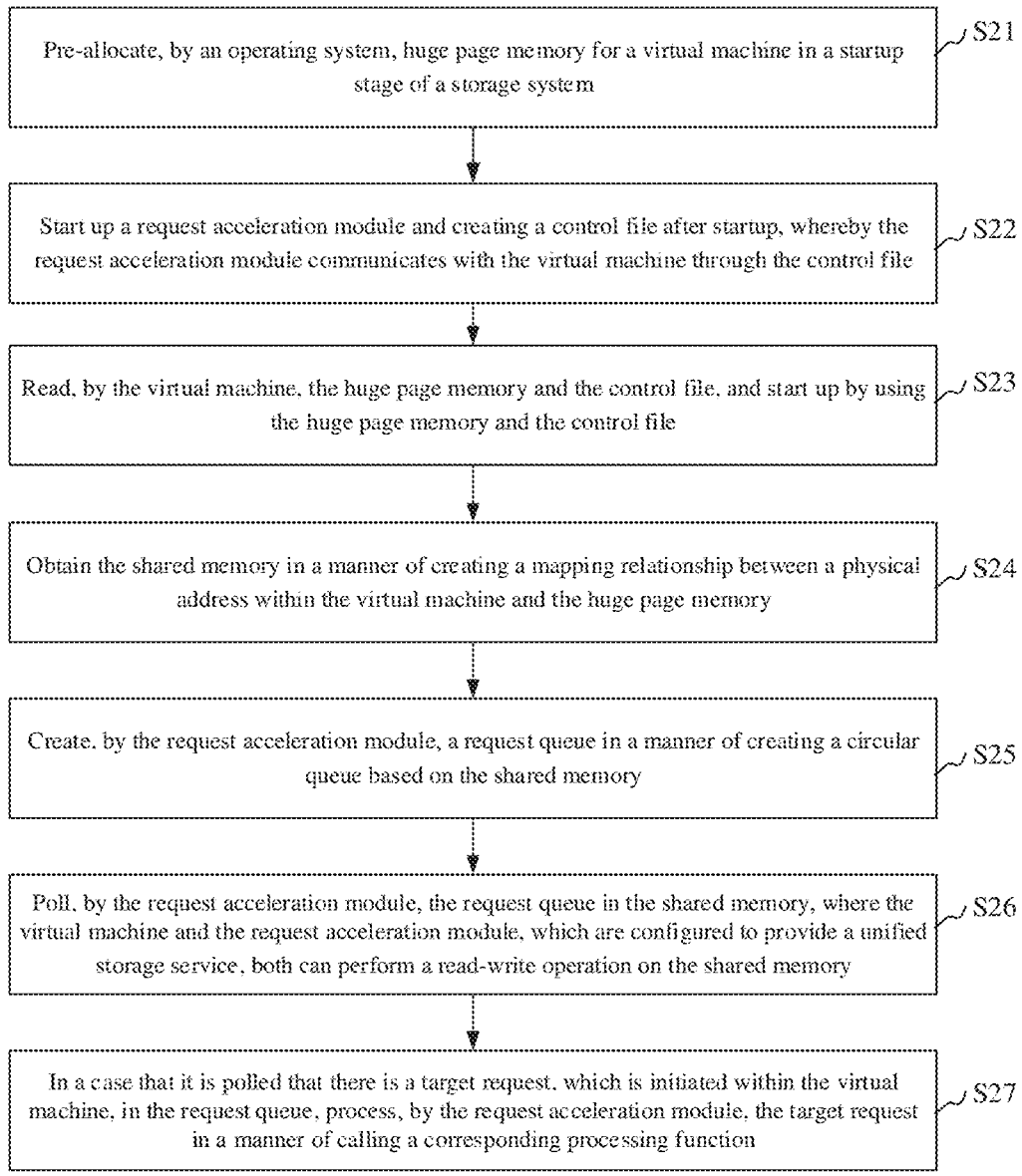
FIG. 2 is a flowchart of an optional request processing method according to an embodiment of the present application.

FIG. 2 is a flowchart of an optional request processing method according to an embodiment of the present application. Referring to FIG. 2, the request processing method includes the following steps:

S21: pre-allocating, by an operating system, huge page memory for the virtual machine in a startup stage of a storage system.

In this embodiment, a shared memory is implemented based on the huge page memory. First, the operating system pre-allocates the huge page memory for the virtual machine in the startup stage of the storage system. When the storage system starts up, the operating system pre-allocates the huge page memory, and the huge page memory supports startup of the virtual machine and use of shared data between the acceleration module and the virtual machine.

S22: starting up a request acceleration module and creating a control file after startup, whereby the request acceleration module communicates with the virtual machine through the control file.

In this embodiment, after the operating system pre-allocates the huge page memory, the request acceleration module starts to start up and creates a control file after startup, whereby the request acceleration module communicates with the virtual machine through the control file. The request acceleration module, after startup, creates the control file used for communication with the virtual machine. The control file will be used as a parameter for starting up the virtual machine to start up the virtual machine. The control file will alternatively be used for the communication between the request acceleration module and the virtual machine. In some embodiments, the control file may be a sock file, that is, the request acceleration module creates the sock file used for communication between the request acceleration module and the virtual machine after startup.

S23: reading, by the virtual machine, the huge page memory and the control file, and starting up by using the huge page memory and the control file.

In this embodiment, when the virtual machine starts up, it may be that the virtual machine reads the huge page memory and the control file, and starts up by using the huge page memory and the control file. During startup, the virtual machine starts up by using the huge page memory reserved by the operating system, and meanwhile, reads the control file created by the request acceleration module.

S24: obtaining the shared memory in a manner of creating a mapping relationship between a physical address within the virtual machine and the huge page memory.

Figure 3:
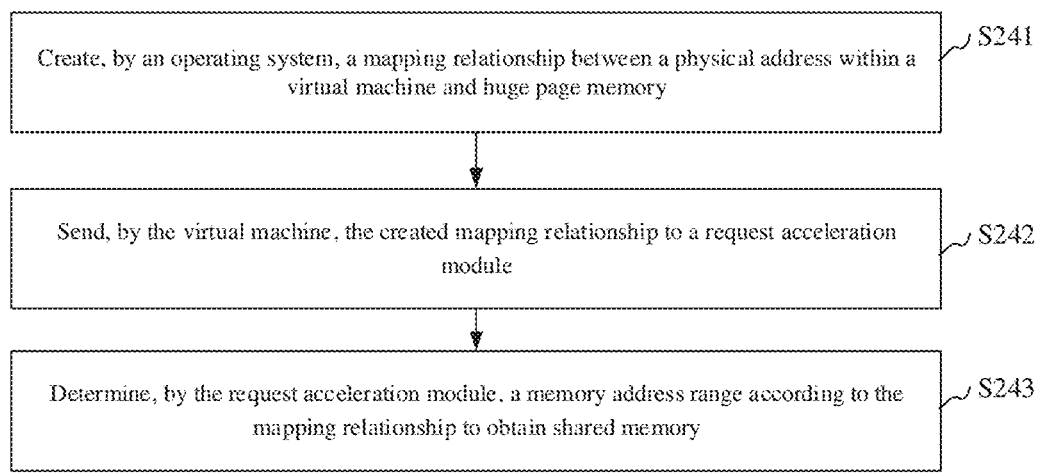
FIG. 3 is a flowchart of an optional shared memory generation method according to an embodiment of the present application.

In this embodiment, after the startup of the virtual machine is completed, the shared memory is obtained in a manner of creating a mapping relationship between a physical address within the virtual machine and the huge page memory. The following steps are included (as shown in FIG. 3):

S241: creating, by an operating system, a mapping relationship between a physical address within a virtual machine and huge page memory.

S242: sending, by the virtual machine, the created mapping relationship to a request acceleration module.

The virtual machine sends the communication signal carrying the mapping relationship to the request acceleration module through a control file.

S243: determining, by the request acceleration module, a memory address range according to the mapping relationship to obtain shared memory.

In this embodiment, the operating system creates the mapping relationship between the physical address within the virtual machine and the huge page memory first. Then, the virtual machine sends the created mapping relationship to the request acceleration module. Finally, the request acceleration module determines a memory address range according to the mapping relationship to obtain the shared memory. A corresponding mapping relationship will be created between the physical address within the virtual machine and the huge page memory, and then the virtual machine sends a signal to inform the request acceleration module of the mapping relationship of the memory address within the virtual machine. In some embodiments, the virtual machine sends the communication signal carrying the mapping relationship to the request acceleration module through a control file. That is, the virtual machine sends the signal through the control file.

In this embodiment, the request acceleration module receives the communication signal, analyzes the communication signal to obtain the mapping relationship, and determines the memory address range according to the mapping relationship to obtain the shared memory. In some embodiments, the request acceleration module, after receiving the signal of the virtual machine, reads an analytic signal, and obtains the memory address range of the virtual machine for communicating with the request acceleration module. This part of memory is shared by the virtual machine and the request acceleration module. Both the virtual machine and the request acceleration module may perform reading and writing on a memory address within this range. The memory address to be issued by I/O data will be recorded in an I/O data structure transmitted during reading and writing.

S25: creating, by the request acceleration module, a request queue in a manner of creating a circular queue based on the shared memory.

In this embodiment, the request acceleration module further creates a request queue in a manner of creating a circular queue after obtaining the shared memory. That is, two annular queues are created based on this memory range to transmit data within the virtual machine, and the number and types of the request queues may be customized according to service needs. These are not limited in this embodiment.

S26: polling, by the request acceleration module, the request queue in the shared memory, where the virtual machine and the request acceleration module, which are configured to provide a unified storage service, both might perform a read-write operation on the shared memory.

S27: in a case that it is polled that there is a target request, which is initiated within the virtual machine, in the request queue, processing, by the request acceleration module, the target request in a manner of calling a corresponding processing function.

In this embodiment, for processes of the foregoing steps S26 and S27, refer to corresponding content disclosed in the foregoing embodiments. Details are repeated herein.

It might be learned that, the operating system in the embodiment of the present application pre-allocates the huge page memory to the virtual machine in a startup stage of the storage system, and then the request acceleration module starts up and creates a control file after startup, whereby the request acceleration module communicates with the virtual machine through the control file. The virtual machine reads the huge page memory and the control file, and starts up by using the huge page memory and the control file. The shared memory is obtained in a manner of creating a mapping relationship between a physical address within the virtual machine and the huge page memory. In some embodiments, the operating system creates the mapping relationship between the physical address within the virtual machine and the huge page memory; the virtual machine sends the created mapping relationship to the request acceleration module; and the request acceleration module determines a memory address range according to the mapping relationship to obtain the shared memory. Then, the request acceleration module creates the request queue in a manner of creating a circular queue based on the shared memory. On this basis, the request acceleration module polls a request queue in the shared memory, where the virtual machine and the request acceleration module, which are configured to provide a unified storage service, both might perform a read-write operation on the shared memory. In a case that it is polled that there is a target request, which is initiated within the virtual machine, in the request queue, the request acceleration module processes the target request in a manner of calling a corresponding processing function. In this embodiment, read and write requests within the virtual machine are directly obtained through the shared memory, I/O address translation of the VMM is omitted, an I/O path is shortened, switches between a user mode and a kernel mode are reduced, first half of processing of I/O is completely completed in the user mode, and the efficiency of I/O processing at the backend of the virtual machine is greatly improved.

Figure 4:
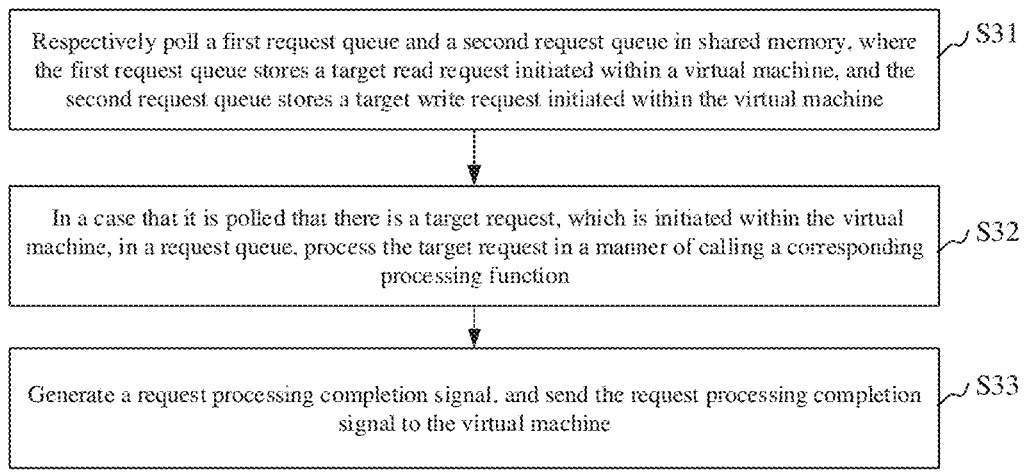
FIG. 4 is a flowchart of another optional request processing method according to an embodiment of the present application.

FIG. 4 is a flowchart of another optional request processing method according to an embodiment of the present application. Referring to FIG. 4, the request processing method, applied to a request acceleration module for connecting a virtual machine and a back-end storage, includes the following steps:

S31: respectively polling a first request queue and a second request queue in shared memory, where the first request queue stores a target read request initiated within a virtual machine, and the second request queue stores a target write request initiated within the virtual machine.

In this embodiment, a request queue includes the first request queue and the second request queue. The request acceleration module polls each of the first request queue and the second request queue in the shared memory in real time during polling the queue. A polling manner may be real-time polling or intermittent polling according to a preset period. This is not limited in this embodiment.

In this embodiment, two request queues are set, which respectively store a read request and a write request. In some embodiments, the first request queue stores a target read request initiated within the virtual machine, and the second request queue stores a target write request initiated within the virtual machine. The first request queue may alternatively be referred to as a send queue, and the second request queue may alternatively be referred to as a receive queue.

S32: in a case that it is polled that there is a target request, which is initiated within the virtual machine, in a request queue, processing the target request in a manner of calling a corresponding processing function.

In this embodiment, for processes of the foregoing step S32, refer to corresponding content disclosed in the foregoing embodiments. Details are repeated herein. In a case that it is polled that there is a target request, which is initiated within the virtual machine, in the request queue, the target request is processed in a manner of calling a corresponding processing function.

S33: generating a request processing completion signal, and sending the request processing completion signal to the virtual machine.

In this embodiment, after processing is completed, a request processing completion signal may alternatively be generated, and the request processing completion signal is sent to the virtual machine.

In an embodiment, when the read request is initiated within the virtual machine, data will be stored in the send queue in the shared memory. The request acceleration module calls the corresponding processing function to process the data when it is found that a new request enters the queue by polling the send queue in the shared memory all the time. The request acceleration module sends an I/O completion signal back to the virtual machine after processing is completed. In a scenario where target data read according to the target read request is stored to the first request queue, after the request acceleration module generates the request processing completion signal, the request processing completion signal is sent to the virtual machine, whereby the virtual machine reads the target data from the first request queue according to the request processing completion signal.

In another an embodiment, when the write request is initiated within the virtual machine, data will be stored in the receive queue in the shared memory. The request acceleration module calls the corresponding processing function to process the data when it is found that a new request enters the queue by polling the send queue in the shared memory all the time, and sends an I/O completion signal back to the virtual machine after processing is completed.

In this embodiment, the first request queue and the second request queue in the shared memory are respectively polled, where the first request queue stores a target read request initiated within the virtual machine, and the second request queue stores a target write request initiated within the virtual machine. In a case that it is polled that there is a target request, which is initiated within the virtual machine, in the request queue, the target request is processed in a manner of calling a corresponding processing function. Finally, a request processing completion signal is generated, and the request processing completion signal is sent to the virtual machine. Requests within the virtual machine might be subjected to classification processing, and meanwhile, a feedback processing mechanism is combined, whereby the request processing efficiency and success rate are improved.

Figure 5:
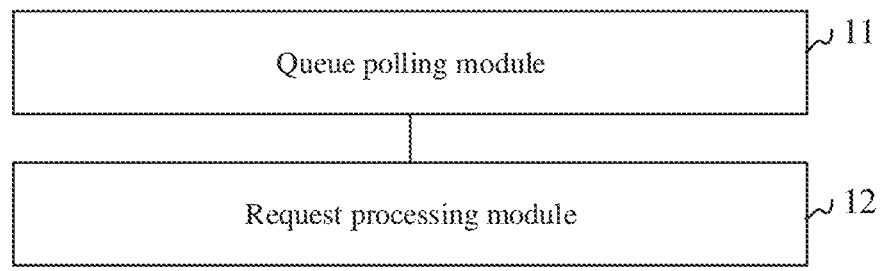
FIG. 5 is a schematic structural diagram of a request processing apparatus according to an embodiment of the present application.

Referring to FIG. 5, the embodiment of the present application further discloses a request processing apparatus, applied to a request acceleration module for connecting a virtual machine and a back-end storage, includes:

a queue polling module 11, configured to poll a request queue in shared memory, where the virtual machine and the request acceleration module, which are configured to provide a unified storage service, both might perform read-write operation on the shared memory; and a request processing module 12, configured to: in a case that it is polled that there is a target request, which is initiated within the virtual machine, in the request queue, process the target request in a manner of calling a corresponding processing function.

A paravirtualization technology is to modify a guest operating system, and add a dedicated API to optimize instructions issued by the guest operating system based on full virtualization, that is, a hypervisor does not need to consume a certain number of resources to perform a translation operation. Therefore, workload of the hypervisor becomes very low, and the overall performance is greatly improved. The hypervisor is a software layer or a subsystem, which is referred to as a virtual machine monitor (VMM). For the VMM, actual physical memory is managed, and physical memory of each virtual machine needs to be allocated and managed. For the guest operating system, continuous physical address space is available. Therefore, the VMM may have a large number of I/O address translations, an I/O path is lengthy, and a large number of switches between a user mode and a kernel mode are involved, resulting in low storage performance of the overall storage system.

In this embodiment, the request acceleration module is provided between the virtual machine and the back-end storage. The request acceleration module connects the virtual machine and the back-end storage, and is configured to shorten the I/O path and reduce the overhead for I/O processing. Taking a NAS service as an example, for unified storage implementation architecture which provides the NAS service through the virtual machine, the backend of the NAS service and a SAN service share a back-end disc array. The NAS service is connected to the back-end disc array through the virtual machine, and provides the NAS service to the outside through a front-end network port. This embodiment, that is, adding an I/O processing acceleration module at the backend of the NAS based on unified storage architecture, improves the backend I/O processing speed.

It may be understood that, the NAS literally refers to an apparatus that is connected to a network and has a data storage function, hence it is alternatively referred to as a "network storage". The NAS is a dedicated data storage server. The NAS takes data as a center, thoroughly separates a storage device from a server, and performs centralized management on data, thereby freeing up bandwidth, improving performance, reducing total costs of ownership, and protecting investments. The costs of the NAS are much lower than that caused by using server storage, but the efficiency is much higher than that of the later one. The request processing solution of this embodiment is suitable for other storage systems. This is not limited in this embodiment.

In this embodiment, the shared memory is shared by the virtual machine and the back-end request acceleration module. Both the virtual machine and the request acceleration module may perform reading and writing on a memory address within this range. The memory address to be issued by I/O data will be recorded in an I/O data structure transmitted during reading and writing. That is, the virtual machine and the request acceleration module, which are configured to provide a unified storage service, both might perform a read-write operation on the shared memory. In addition, a request queue is also set in the shared memory, and the number and types of the request queues may be customized according to service needs. These are not limited in this embodiment.

In this embodiment, when the request queue is polled, in a case that it is polled that there is a target request, which is initiated within the virtual machine, in the request queue, the target request is processed in a manner of calling a corresponding processing function. When the request is initiated within the virtual machine, data will be stored in the request queue in the shared memory, and the back-end request acceleration module calls the corresponding processing function to process the data when it is found that a new request enters the queue by polling the request queue in the shared memory all the time. In a manner of using the shared memory+I/O queue polling, the overhead for switching between a user mode and a kernel mode is reduced, and an I/O path is shortened, thereby improving the performance of the overall storage system.

It might be learned that, in the embodiment of the present application, a request queue in shared memory is polled first, where a virtual machine and a request acceleration module, which are configured to provide a unified storage service, both might perform a read-write operation on the shared memory; and when it is polled that there is a target request, which is initiated within the virtual machine, in the request queue, the target request is processed in the manner of calling a corresponding processing function. In the embodiment of the present application, the request acceleration module is provided between the virtual machine and the back-end storage, and the request acceleration module connects the virtual machine and the back-end storage, and processes an I/O request by means of using the shared memory and request queue polling, whereby the number of memory copies and the number of switches between a user mode and a kernel mode are reduced. By implementing a virtual machine-request acceleration module, an I/O path is shortened, the overhead for I/O processing is reduced, and the speed of connecting a backend of the virtual machine to a disc array is increased, thereby accelerating I/O processing performance and improving the performance of the whole storage system.

In some optional embodiments, the request processing apparatus further includes:
 a memory allocation module, configured for an operating system to pre-allocate huge page memory for the virtual machine in a startup stage of a storage system;
 a file creation module, configured for the request acceleration module to start up and create a control file after startup, whereby the request acceleration module communicates with the virtual machine through the control file;
 a virtual machine startup module, configured for the virtual machine to read the huge page memory and the control file, and to start up by using the huge page memory and the control file; and
 a mapping relationship creation module, configured for the operating system to obtain the shared memory in a manner of creating a mapping relationship between a physical address within the virtual machine and the huge page memory.

In some optional embodiments, the mapping relationship creation module includes:
 a creation unit, configured for the operating system to create the mapping relationship between the physical address within the virtual machine and the huge page memory;
 a relationship sending unit, configured for the virtual machine to send the created mapping relationship to the request acceleration module; and
 an address range determination unit, configured for the request acceleration module to determine a memory address range according to the mapping relationship to obtain the shared memory.

In some optional embodiments, the relationship sending unit is configured for the virtual machine to send a communication signal carrying the mapping relationship to the request acceleration module through the control file.

In some optional embodiments, the address range determination unit is configured for the request acceleration module to receive the communication signal, analyze the communication signal to obtain the mapping relationship, and determine the memory address range according to the mapping relationship to obtain the shared memory.

In some optional embodiments, the file creation module is configured for the request acceleration module to create a sock file used for communication between the request acceleration module and the virtual machine after startup.

In this embodiment, a shared memory is implemented based on huge page memory. First, the operating system pre-allocates the huge page memory for the virtual machine in the startup stage of the storage system. When the storage system starts up, the operating system pre-allocates the huge page memory, and the huge page memory supports startup of the virtual machine and use of shared data between the acceleration module and the virtual machine.

In this embodiment, after the operating system pre-allocates the huge page memory, the request acceleration module starts to start up and creates a control file after startup, whereby the request acceleration module communicates with the virtual machine through the control file. The request acceleration module, after startup, further creates the control file used for communication with the virtual machine. The control file will be used as a parameter for starting up the virtual machine to start up the virtual machine. The control file will alternatively be used for the communication between the request acceleration module and the virtual machine. In some embodiments, the control file may be a sock file, that is, the request acceleration module creates the sock file used for communication between the request acceleration module and the virtual machine after startup.

In this embodiment, when the virtual machine starts up, it may be that the virtual machine reads the huge page memory and the control file, and starts up by using the huge page memory and the control file. During startup, the virtual machine starts up by using the huge page memory reserved by the operating system, and meanwhile, reads the control file created by the request acceleration module.

In this embodiment, after the startup of the virtual machine is completed, the shared memory is obtained in a manner of creating a mapping relationship between a physical address within the virtual machine and the huge page memory.

In this embodiment, the operating system creates the mapping relationship between the physical address within the virtual machine and the huge page memory first. Then, the virtual machine sends the created mapping relationship to the request acceleration module. Finally, the request acceleration module determines a memory address range according to the mapping relationship to obtain the shared memory. A corresponding mapping relationship will be created between the physical address within the virtual machine and the huge page memory, and then the virtual machine sends a signal to inform the request acceleration module of the mapping relationship of the memory address within the virtual machine. In some embodiments, the virtual machine sends the communication signal carrying the mapping relationship to the request acceleration module through the control file. That is, the virtual machine sends the signal through the control file.

In this embodiment, the request acceleration module receives the communication signal, analyzes the communication signal to obtain the mapping relationship, and determines the memory address range according to the mapping relationship to obtain the shared memory. In some embodiments, the request acceleration module, after receiving the signal of the virtual machine, reads an analytic signal, and obtains the memory address range of the virtual machine for communicating with the request acceleration module. This part of memory is shared by the virtual machine and the request acceleration module. Both the virtual machine and the request acceleration module may perform reading and writing on a memory address within this range. The memory address to be issued by I/O data will be recorded in an I/O data structure transmitted during reading and writing.

In this embodiment, the request acceleration module further creates a request queue in a manner of creating a circular queue after obtaining the shared memory. That is, two annular queues are created based on this memory range to transmit data within the virtual machine, and the number and types of the request queues may be customized according to service needs. These are not limited in this embodiment.

In some optional embodiments, the request queue includes a first request queue and a second request queue. The queue polling module 11 is configured to poll the first request queue and the second request queue in the shared memory respectively, where the first request queue stores a target read request initiated within the virtual machine, and the second request queue stores a target write request initiated within the virtual machine.

In some optional embodiments, the request processing apparatus further includes:
- a signal generation and sending module, configured to generate a request processing completion signal, and send the request processing completion signal to the virtual machine; and
- a queue creation module, configured for the request acceleration module to create a request queue in a manner of creating a circular queue based on the shared memory.

In some optional embodiments, in a case that the target request is a target read request, the request processing apparatus further includes:
- a read and storage module, configured to store target data read according to the target read request to the first request queue.

Correspondingly, the signal generation and sending module is configured to generate a request processing completion signal, and send the request processing completion signal to the virtual machine, whereby the virtual machine reads the target data from the first request queue according to the request processing completion signal.

In this embodiment, a request queue includes the first request queue and the second request queue. The request acceleration module polls each of the first request queue and the second request queue in the shared memory in real time during polling the queue. A polling manner may be real-time polling or intermittent polling according to a preset period. This is not limited in this embodiment.

In this embodiment, two request queues are set, which respectively store a read request and a write request. In some embodiments, the first request queue stores a target read request initiated within the virtual machine, and the second request queue stores a target write request initiated within the virtual machine. The first request queue may alternatively be referred to as a send queue, and the second request queue may alternatively be referred to as a receive queue.

In this embodiment, in a case that it is polled that there is a target request, which is initiated within the virtual machine, in the request queue, the target request is processed in a manner of calling a corresponding processing function.

In this embodiment, after processing is completed, a request processing completion signal may alternatively be generated, and the request processing completion signal is sent to the virtual machine.

In an embodiment, when the read request is initiated within the virtual machine, data will be stored in the send queue in the shared memory. The request acceleration module calls the corresponding processing function to process the data when it is found that a new request enters the queue by polling the send queue in the shared memory all the time. The request acceleration module sends an I/O completion signal back to the virtual machine after processing is completed. In a scenario where target data read according to the target read request is stored to the first request queue, after the request acceleration module generates the request processing completion signal, the request processing completion signal is sent to the virtual machine, whereby the virtual machine reads the target data from the first request queue according to the request processing completion signal.

In another an embodiment, when the write request is initiated within the virtual machine, data will be stored in the receive queue in the shared memory. The request acceleration module calls the corresponding processing function to process the data when it is found that a new request enters the queue by polling the send queue in the shared memory all the time, and sends an I/O completion signal back to the virtual machine after processing is completed.

Figure 6:
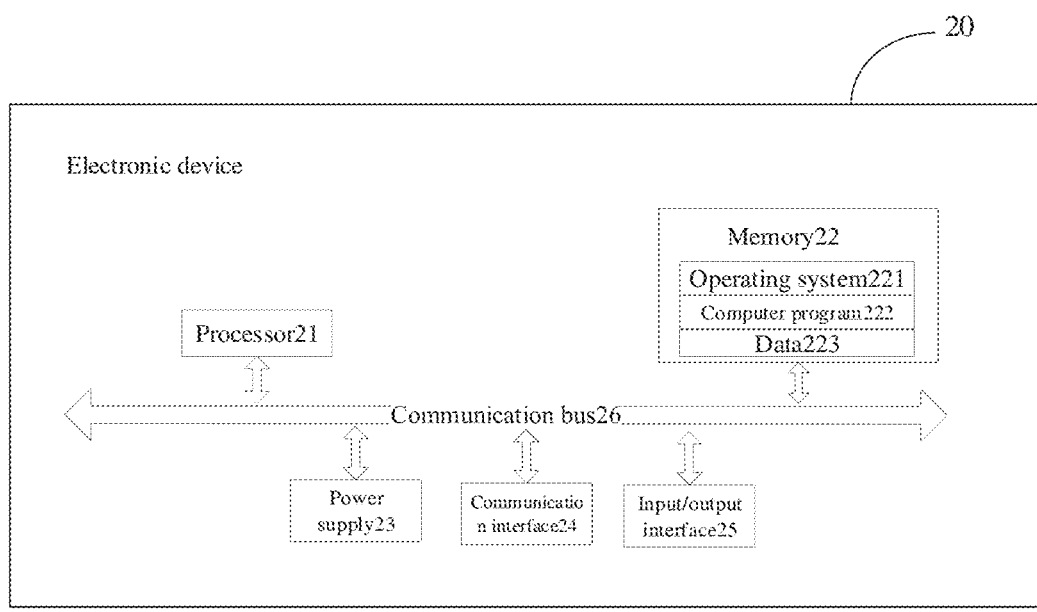
FIG. 6 is a structural diagram of a request processing electronic device according to an embodiment of the present application.

Further, the embodiment of the present application further provides an electronic device. FIG. 6 is a structural diagram of a request processing electronic device according to an embodiment of the present application. Content in the figure might not be considered as any limitation on the scope of use of the present application.

FIG. 6 is a schematic structural diagram of an electronic device 20 according to the embodiment of the present application. The electronic device 20 may include: at least one processor 21, at least one memory 22, a power supply 23, a communication interface 24, an input/output interface 25, and a communication bus 26. The memory 22 is configured to store a computer program, and the computer program is loaded and executed by the processor 21 to implement related steps in the request processing method disclosed in any of the foregoing embodiments.

In this embodiment, the power supply 23 is configured to supply a working voltage to various hardware devices on the electronic device 20. The communication interface 24 might create a data transmission channel between the electronic device 20 and an external device, and follows a communication protocol which might be any communication protocol applicable to a technical solution in the present application. This is not limited herein. The input/output interface 25 is configured to obtain data input from the outside world or output data to the outside world. An optional interface type of the input/output interface 25 may be selected according to application needs. This is not limited herein.

In addition, the memory 22, serving as a carrier for resource storage, may be a read-only memory, a random-access memory, a magnetic disc, a compact disc, or the like. Resources stored in the memory 22 may include an operating system 221, a computer program 222, data 223, and the like. A storage manner may be transient storage or persistent storage.

The operating system 221 is configured to manage and control various hardware devices on the electronic device 20 and the computer program 222 to implement computing and processing of massive data 223 in the memory 22 by the processor 21, and may be Windows, Server, Netware, Unix, Linux, and the like. In addition to including a computer program that might be set to complete the request processing method that is disclosed in any of the foregoing embodiments and is executed by the electronic device 20, the computer program 222 may further include a computer program that might be set to complete other specific work. The data 223 may include a read-write operation collected by the electronic device 20.

Further, the embodiment of the present application further discloses a non-volatile readable storage medium. The non-volatile readable storage medium stores a computer program. The computer program implements steps of the request processing method disclosed in any of the foregoing embodiments.

Various embodiments in the present specification are described in a progressive manner. Each embodiment focuses on differences from other embodiments, and the same or similar parts of various embodiments may be referred to one another. The apparatus disclosed in the embodiment is described relatively simply since the apparatus corresponds to the method disclosed in the embodiment. For relevant content, refer to the description of a method section.

Finally, it is also to be noted that relational terms such as first and second are merely used for distinguishing one entity or operation from another entity or operation herein, and do not necessarily require or imply existence of any such actual relationship or order between these entities or operations. Moreover, terms "include", "contain" or any other variations thereof are intended to cover a non-exclusive inclusion, such that a process, method, article or device including a series of elements not only includes those elements, but also includes those elements that are not explicitly listed, or includes elements inherent to such a process, method, article or device. In the absence of more restrictions, elements defined by the phrase "include a/an . . . " do not exclude the existence of additional identical elements in the process, method, article, or device that includes the elements.

The above describes the request processing method and apparatus, a device, and a non-volatile readable storage medium provided in the present application in detail. Principles and implementations of the present application are described by using examples herein. The description of the above embodiments is only for helping to understand the method of the present application and core ideas of the method. Furthermore, for those of ordinary skill in the art, according to the idea of the present application, there will be changes in implementations and application scopes. In conclusion, content of the present specification is not to be construed as a limitation to the present application.

What is claimed is:

1. A request processing method, applied to a request acceleration module for connecting a virtual machine and a back-end storage, and comprising:
   polling a request queue in shared memory, wherein the virtual machine and the request acceleration module, which are executed by a processor to provide a unified storage service, both perform a read-write operation on the shared memory;
   in response to the request queue being polled that there is a target request, which is initiated within the virtual machine, in the request queue, processing the target request in a manner of calling a corresponding processing function;
   pre-allocating, by an operating system, huge page memory for the virtual machine in a startup stage of a storage system;
   creating, by the operating system, a mapping relationship between a physical address within the virtual machine and the huge page memory;
   sending, by the virtual machine, the mapping relationship to the request acceleration module; and
   determining, by the request acceleration module, a memory address range according to the mapping relationship to obtain the shared memory;
   wherein the request queue comprises a first request queue and a second request queue;
   wherein the polling a request queue in shared memory comprises:
      respectively polling the first request queue and the second request queue in the shared memory, wherein the first request queue stores a target read request initiated within the virtual machine, and the second request queue stores a target write request initiated within the virtual machine;
   wherein after the processing the target request in a manner of calling a corresponding processing function, the method further comprises:
      generating a request processing completion signal, and sending the request processing completion signal to the virtual machine; and
   wherein in response to the target request being the target read request, after the processing the target request in a manner of calling a corresponding processing function, the method further comprises:
      storing target data read according to the target read request to the first request queue; and
      generating the request processing completion signal, and sending the request processing completion signal to the virtual machine, whereby the virtual machine reads the target data from the first request queue according to the request processing completion signal.

2. The request processing method according to claim 1, wherein the sending, by the virtual machine, the mapping relationship to the request acceleration module comprises:
   sending, by the virtual machine, a communication signal carrying the mapping relationship to the request acceleration module.

3. The request processing method according to claim 2, wherein the sending, by the virtual machine, a communication signal carrying the mapping relationship to the request acceleration module comprises:
   sending, by the virtual machine, the communication signal carrying the mapping relationship to the request acceleration module through a control file.

4. The request processing method according to claim 2, wherein before the creating, by the operating system, a mapping relationship between a physical address within the virtual machine and the huge page memory, the method further comprises:
   reading, by the virtual machine, the huge page memory and a control file, and starting up by using the huge page memory and the control file.

5. The request processing method according to claim 2, wherein the sending, by the virtual machine, the mapping relationship to the request acceleration module comprises:
   sending, by the virtual machine, the communication signal carrying the mapping relationship to the request acceleration module through a control file.

6. The request processing method according to claim 1, wherein after the pre-allocating, by an operating system, huge page memory for the virtual machine in a startup stage of a storage system, the method further comprises:
   starting up the request acceleration module and creating a control file after startup, whereby the request acceleration module communicates with the virtual machine through the control file.

7. The request processing method according to claim 6, wherein the starting up the request acceleration module and creating a control file after startup comprises:
   creating, by the request acceleration module, a sock file used for communication between the request acceleration module and the virtual machine after startup.

8. The request processing method according to claim 7, wherein the determining, by the request acceleration module, a memory address range according to the mapping relationship to obtain the shared memory comprises:

receiving, by the request acceleration module, a communication signal, analyzing the communication signal to obtain the mapping relationship, and determining the memory address range according to the mapping relationship to obtain the shared memory.

9. The request processing method according to claim 6, wherein after the starting up the request acceleration module and creating a control file after startup, the method further comprises:
using the control file as a parameter for starting up the virtual machine to start up the virtual machine.

10. The request processing method according to claim 6, wherein after the starting up the request acceleration module and creating a control file after startup, the method further comprises:
using the control file for the communication between the request acceleration module and the virtual machine.

11. The request processing method according to claim 1, wherein the polling a request queue in shared memory comprises: polling the request queue in the shared memory; and in a case that the request queue is polled that a new request enters the request queue, determining the new request as the target request; and
in response to the request queue being polled that there is a target request, which is initiated within the virtual machine, in the request queue, processing the target request in a manner of calling a corresponding processing function comprises: calling the corresponding processing function to process corresponding data of the target request, wherein corresponding data is stored in the request queue in the shared memory in a case that the new request is initialized within the virtual machine.

12. The request processing method according to claim 1, wherein the respectively polling the first request queue and the second request queue in the shared memory further comprises:
respectively polling the first request queue and the second request queue in the shared memory in real time.

13. The request processing method according to claim 1, further comprising:
creating, by the request acceleration module, the request queue in a manner of creating a circular queue based on the shared memory.

14. The request processing method according to claim 1, further comprising:
recording a target memory address, at which an input/output (I/O) request data is to be issued, in an I/O data structure during transmitting.

15. The request processing method according to claim 1, wherein the respectively polling the first request queue and the second request queue in the shared memory further comprises:
intermittently polling each of the first request queue and the second request queue in the shared memory according to a preset period.

16. An electronic device, comprising a processor and a memory, wherein the memory is configured to store a computer program, and the computer program is loaded and executed by the processor to perform a request processing method applied to a request acceleration module for connecting a virtual machine and a back-end storage, and upon execution by the processor, the computer program causes the processor to perform operations comprising:
polling a request queue in shared memory, wherein the virtual machine and the request acceleration module, which are executed by the processor to provide a unified storage service, both perform a read-write operation on the shared memory;
in response to the request queue being polled that there is a target request, which is initiated within the virtual machine, in the request queue, processing the target request in a manner of calling a corresponding processing function;
pre-allocating, by an operating system, huge page memory for the virtual machine in a startup stage of a storage system;
creating, by the operating system, a mapping relationship between a physical address within the virtual machine and the huge page memory;
sending, by the virtual machine, the mapping relationship to the request acceleration module; and
determining, by the request acceleration module, a memory address range according to the mapping relationship to obtain the shared memory;
wherein the request queue comprises a first request queue and a second request queue;
wherein the polling a request queue in shared memory comprises:
respectively polling the first request queue and the second request queue in the shared memory, wherein the first request queue stores a target read request initiated within the virtual machine, and the second request queue stores a target write request initiated within the virtual machine;
wherein after the processing the target request in a manner of calling a corresponding processing function, the method further comprises:
generating a request processing completion signal, and sending the request processing completion signal to the virtual machine; and
wherein in response to the target request being the target read request, after the processing the target request in a manner of calling a corresponding processing function, the method further comprises:
storing target data read according to the target read request to the first request queue; and
generating the request processing completion signal, and sending the request processing completion signal to the virtual machine, whereby the virtual machine reads the target data from the first request queue according to the request processing completion signal.

17. A non-transitory readable storage medium, storing computer instructions, wherein upon execution by a processor, the computer instructions cause the processor to perform a request processing method applied to a request acceleration module for connecting a virtual machine and a back-end storage, comprising:
polling a request queue in shared memory, wherein the virtual machine and the request acceleration module, which are executed by the processor to provide a unified storage service, both perform a read-write operation on the shared memory;
in response to the request queue being polled that there is a target request, which is initiated within the virtual machine, in the request queue, processing the target request in a manner of calling a corresponding processing function;
pre-allocating, by an operating system, huge page memory for the virtual machine in a startup stage of a storage system;

creating, by the operating system, a mapping relationship between a physical address within the virtual machine and the huge page memory;

sending, by the virtual machine, the mapping relationship to the request acceleration module; and determining, by the request acceleration module, a memory address range according to the mapping relationship to obtain the shared memory;

wherein the request queue comprises a first request queue and a second request queue;

wherein the polling a request queue in shared memory comprises:

respectively polling the first request queue and the second request queue in the shared memory, wherein the first request queue stores a target read request initiated within the virtual machine, and the second request queue stores a target write request initiated within the virtual machine;

wherein after the processing the target request in a manner of calling a corresponding processing function, the method further comprises:

generating a request processing completion signal, and sending the request processing completion signal to the virtual machine; and wherein in response to the target request being the target read request, after the processing the target request in a manner of calling a corresponding processing function, the method further comprises:

storing target data read according to the target read request to the first request queue; and generating the request processing completion signal, and sending the request processing completion signal to the virtual machine, whereby the virtual machine reads the target data from the first request queue according to the request processing completion signal.

\* \* \* \* \*